United States Patent [19]

Boyd

[11] 4,379,698
[45] Apr. 12, 1983

[54] ASTROLOGY CHART APPARATUS

[76] Inventor: George M. Boyd, 1050 S. Beech, Wichita, Kans. 67207

[21] Appl. No.: 247,389

[22] Filed: Mar. 25, 1981

[51] Int. Cl.³ .............................................. G09B 29/00
[52] U.S. Cl. ..................................... 434/106; 434/404
[58] Field of Search ................ 434/106, 404; 273/161; 235/88 R, 88 RC, 88 G, 88 N

[56] References Cited

U.S. PATENT DOCUMENTS

| | | | |
|---|---|---|---|
| 3,249,085 | 5/1966 | St. Jean | 434/404 X |
| 3,692,238 | 9/1972 | Boyd | 434/404 X |
| 3,936,957 | 2/1976 | Nordbye | 434/404 X |
| 4,189,853 | 2/1980 | Provenzano | 434/106 |
| 4,193,213 | 3/1980 | Suda | 434/106 |
| 4,219,944 | 9/1980 | Keenan | 434/106 |

Primary Examiner—Harland S. Skogquist
Attorney, Agent, or Firm—Phillip A. Rein

[57] ABSTRACT

This invention is an astrology chart apparatus operable to readily determine (1) characteristics of any of the twelve houses of astrology; (2) key words relative to any such house; (3) comparison ratings of compatability between any sun sign with another persons's sun sign. The astrology chart apparatus includes a central base means having first and second plate means rotatably connected to the central base means by a fastening means. The central base means has central plate indicia means with astrology information that can be viewed outside the outer periphery of first and second plate means plus through cut-out window means therein. Additionally, the first and second plate means are provided with plate indicia means thereon of an astrology nature which can be viewed separately or in conjunction with the central plate indicia means. The window means on the first and second plate means permit comparison of certain astrology information on the central base means and the respective first and second plate means.

9 Claims, 13 Drawing Figures

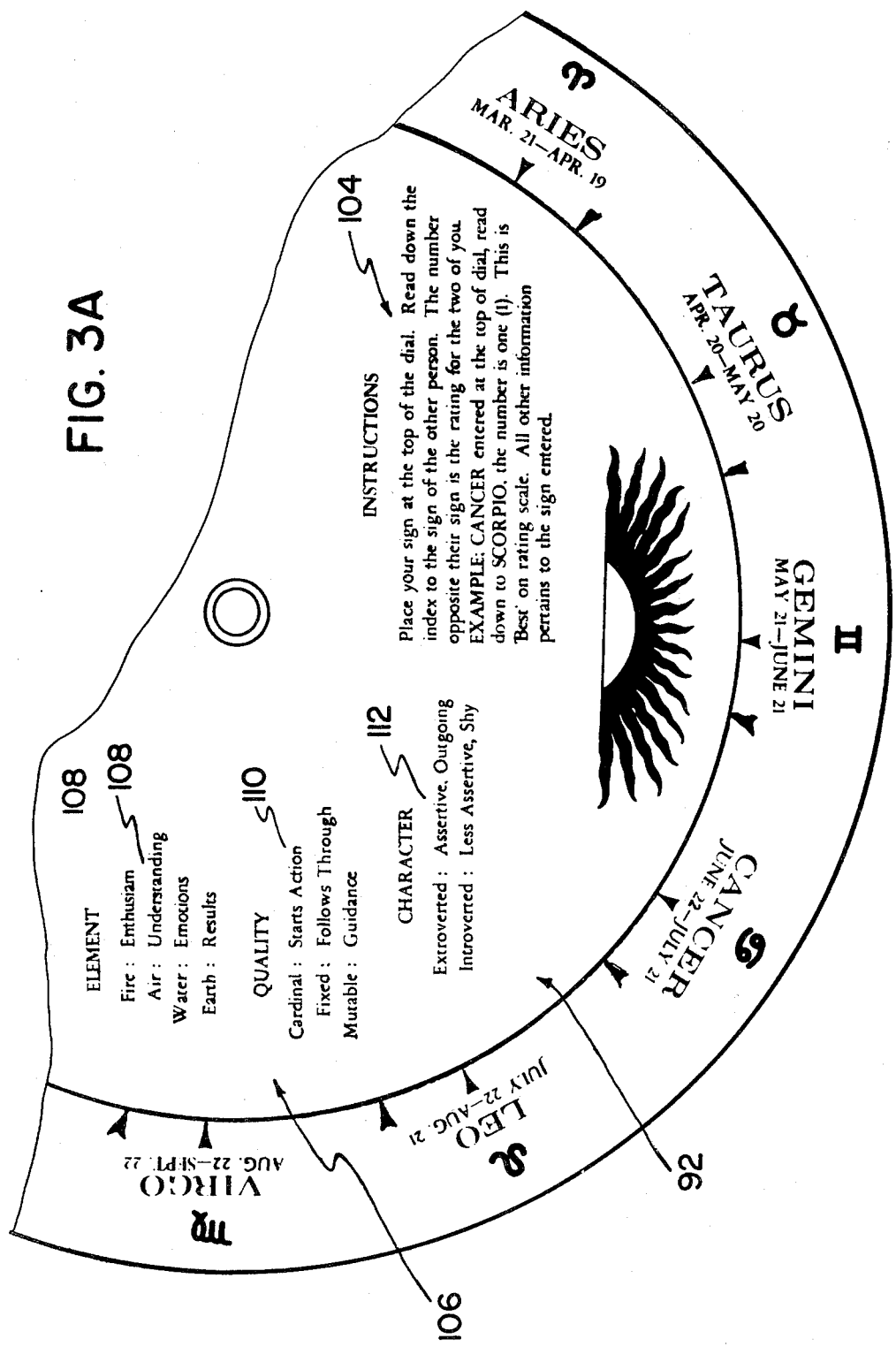

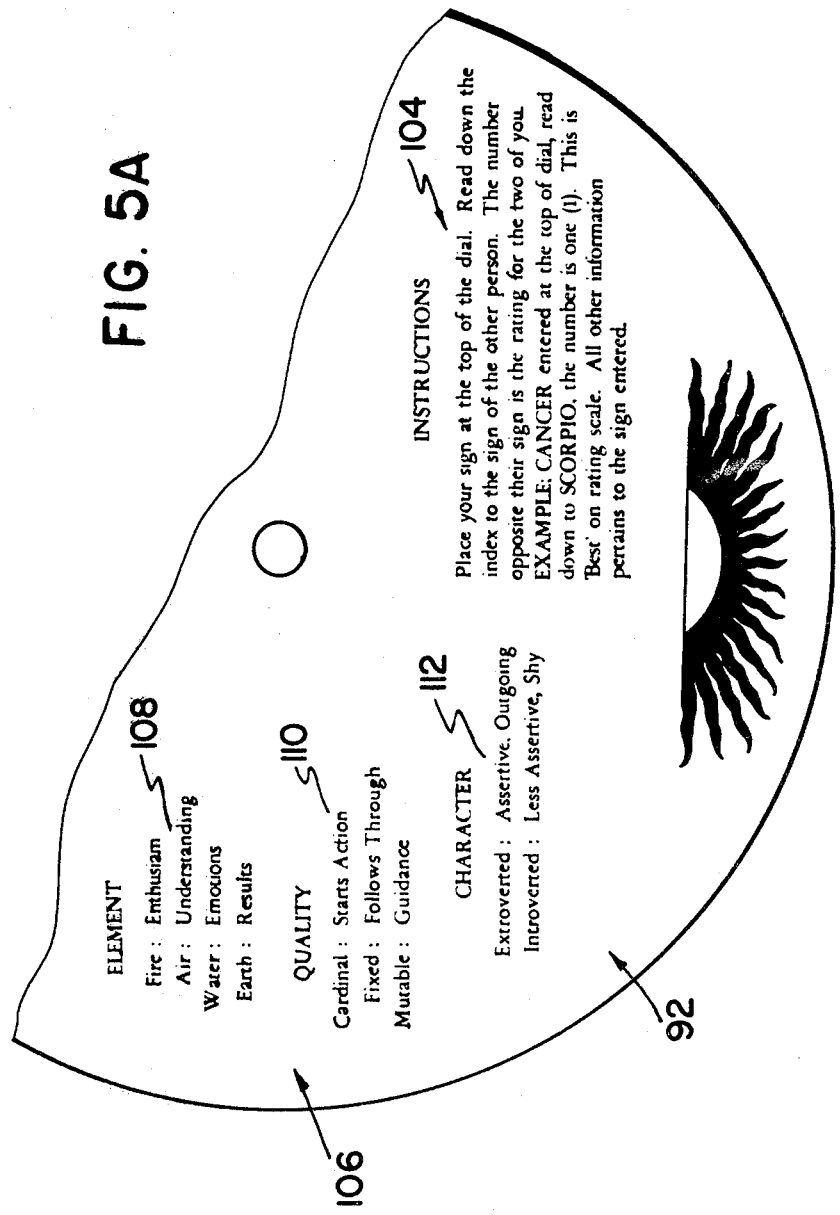

ASTROLOGY CHART APPARATUS

PRIOR ART

The most pertinent art would appear to be the applicant's own U.S. Pat. No. 3,692,238, issued Sept. 19, 1972, entitled Navigational Aid and the references cited thereon being:

U.S. Pat. Nos.
1,546,928 Graham
2,506,299 Isom
2,508,894 Schloer
3,058,653 Des Granges
3,249,085 St. Jean
3,262,640 Jameson
1,849,379 Passek FOREIGN PATENT OR APPLICATION NOS.
461,946 Great Britain
809,473 Great Britain
85,589 Sweden The Boyd patent is similar in using interconnected rotatable disk members but used like a slide rule for navigational purposes. The invention herein is for astrology purposes having substantially different indicia and window means.

The Des Granges patent is also a rotatable calculator table structure. The Magalow British patent discloses a mileage chart but none of these references are concerned with the area of astrology.

BACKGROUND

Astrology is the study of the sun, moon, planets, and stars in an attempt to foretell future events on earth. This study is based on the belief that the heavenly bodies control the affairs of men, and that the movements and positions of those bodies can be used to predict the future.

The basic belief of astrology is that masses of matter millions of miles or kilometers away determine the destinies of human beings.

Among the many terms of astrologers, zodiac and house are the most common. The zodiac is that portion of the sky through which the sun, moon and planets move from east to west. For astrological purposes the zodiac is divided into 12 portions called houses, or the houses of heaven. Each house is named for a constellation, called a sign of the zodiac. An astrologer casts a horoscope depicting the character of a person and prophesying the events of his life by preparing a diagram representing the heavens at the time of his birth.

The diagram shows the positions of the heavenly bodies within the houses with relation to one another and with relation to the horizon. The houses can also be divided into various kinds, and control over various phases of human lives assigned to each of the principal heavenly bodies.

The astrology chart apparatus of this invention takes basic principles of astrology and condenses them into proper location so that comparison of various houses of heaven can be readily available plus characteristics of the individual houses.

PREFERRED EMBODIMENT OF THE INVENTION

In one preferred embodiment of this invention, an astrology chart apparatus is provided that is used to quickly present one's astrology characteristics, symbols, characteristic key words, and house capability comparisons. The astrology chart apparatus consists of three interconnected disk members having astrology information thereon. More specifically, the astrological chart apparatus includes (1) a central base plate means; (2) a first plate means; (3) a second plate means; and (4) a fastening means to rotatably connect the first and second plate means to respective opposite sides of the central base plate means. The central base plate means is provided with astrology indicia means on both sides thereof to be read and interperted in conjunction with the first and second plate means. Each of the first and second plate means includes astrological plate indicia means and access window means. The astrology plate indicia means provides information by itself and also is used in conjunction with the window means to reveal information and astrology comparisons from the central base plate means. This is because the window means are cut out openings in the first and second plate means that are aligned with astrology information on the central base plate means.

OBJECTS OF THE INVENTION

One object of this invention is to provide an astrology chart apparatus that readily presents astrology information and means to compare two person's astrology signs and compatability.

Another object of this invention is to provide an astrology chart apparatus having a central base plate member sandwiched between front and back plate members, each having indicia means thereon containing astrology information.

A further object of this invention is to provide an astrology chart apparatus having front and back plate members independently rotatably connected to a base plate member; and the front and back plate members each having cut out windows to selectively reveal astrology information printed on the base plate member.

One other object of this invention is to provide an astrology chart apparatus that is easy to use; durable in construction; easy to clean and maintain; and entertaining in operation thereof.

Still, one other object of this invention is to provide an astrology chart apparatus that is a tool to readily compare one's astrological characteristics to another's without the use of numerous charts, etc., to compile a horoscope.

Various other objects, advantages, and features of the invention will become apparent to those skilled in the art from the following discussion, taken in conjunction with the accompanying drawings, in which:

FIGURES OF THE INVENTION

FIG. 3A is a side elevational view of a remaining portion of the other side of the astrology chart apparatus shown in FIG. 3;

FIG. 5A is a view of a remaining portion of one side of the back plate member of the astrology chart apparatus shown in FIG. 5;

Figure 1:
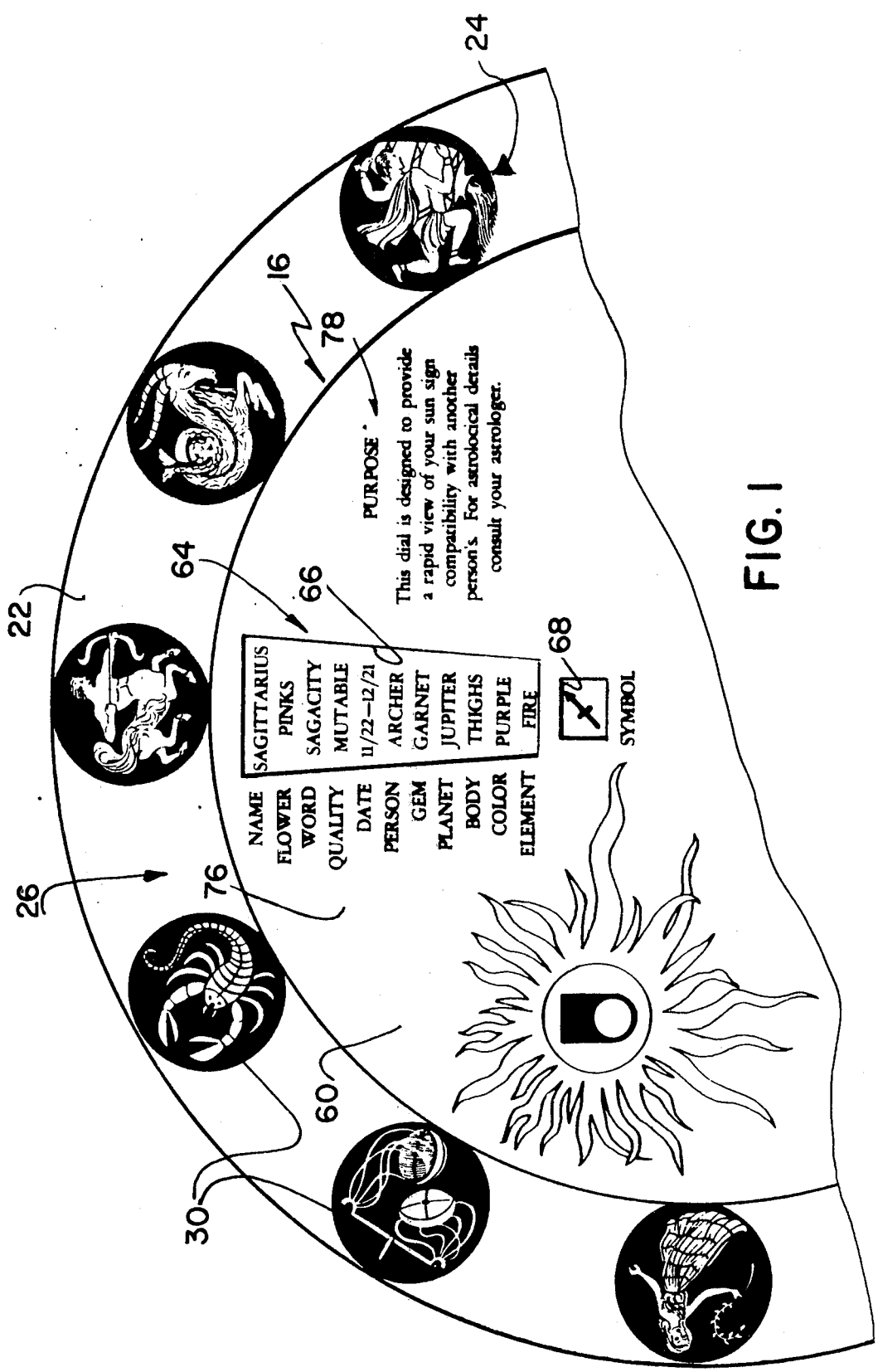
FIG. 1 is a side elevational view of a portion of one side of an astrology chart apparatus of this invention.

The following is a discussion and description of preferred specific embodiments of the new astrology chart apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figure 1A:
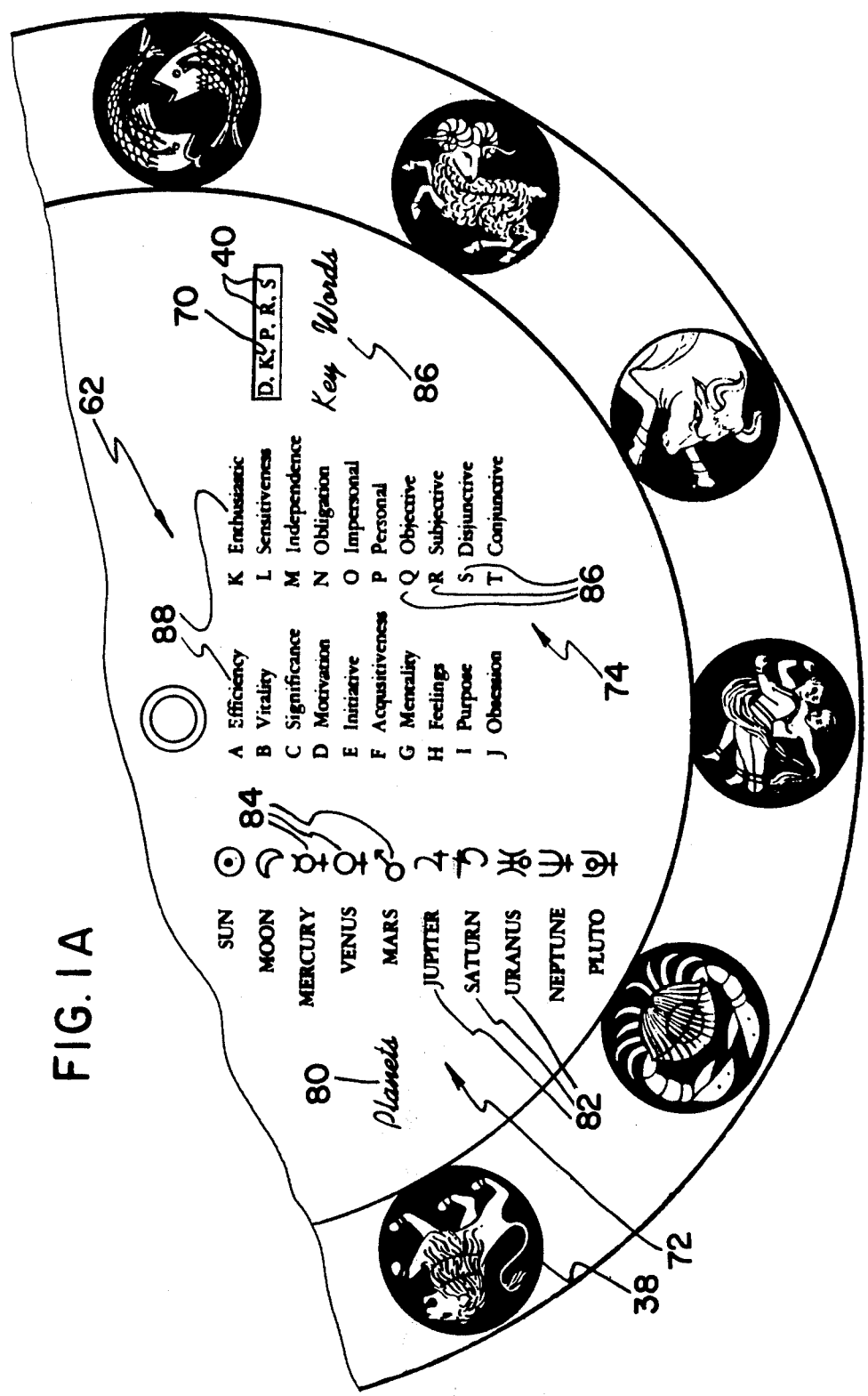
FIG. 1A is a side elevational view of a remaining portion of the one side of an astrology chart apparatus shown in FIG. 1.
Figure 3:
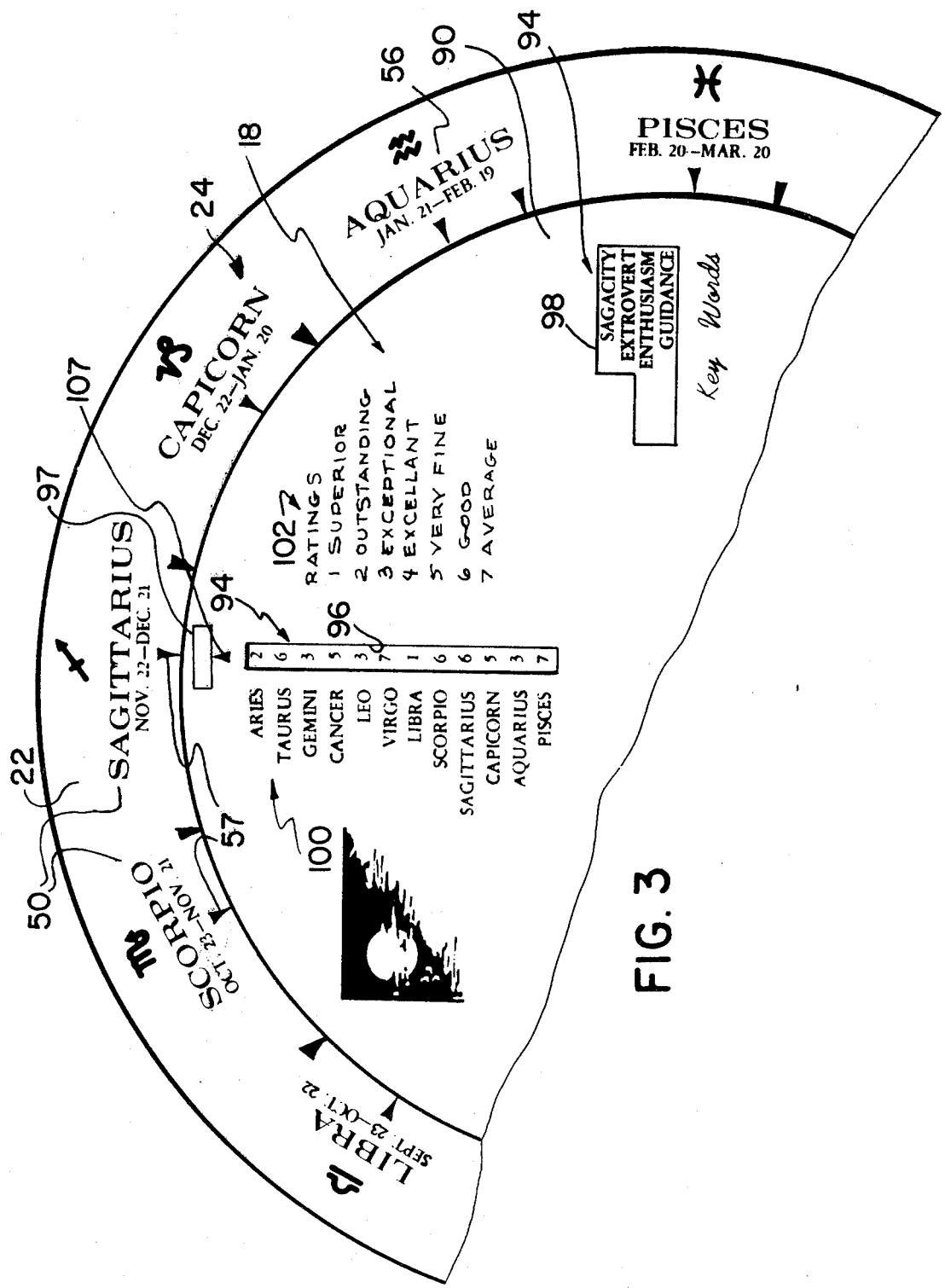
FIG. 3 is a side elevational view of a portion of the other side of the astrology chart apparatus of this invention.
Figure 4:
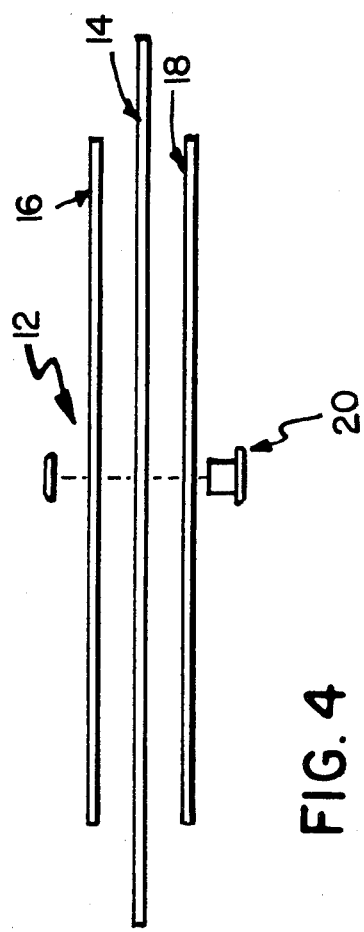
FIG. 4 is an exploded end view of the astrology chart apparatus of this invention.

Referring to the drawings in detail, a front side of an astrology chart apparatus 12 of this invention is shown in FIGS. 1 and 1A with a rear side view thereof shown in FIG. 3. The astrology chart apparatus 12 includes (1) a central base means 14; (2) a first plate means 16; (3) a second plate means 18; and (4) a fastening means 20 used to interconnect the first and second plate means 16, 18 to the central base means 14. (FIG. 4)

The central base means 14 includes a circular base plate or disk member 22 having central plate indicia means 24 thereon. The base plate member 22 extends outwardly of the first and second plate means 16, 18 so as to be easily grasped by one's fingers for independent, selective rotation of the first and second plate means 16, 18 in a manner to be explained.

Figure 6:
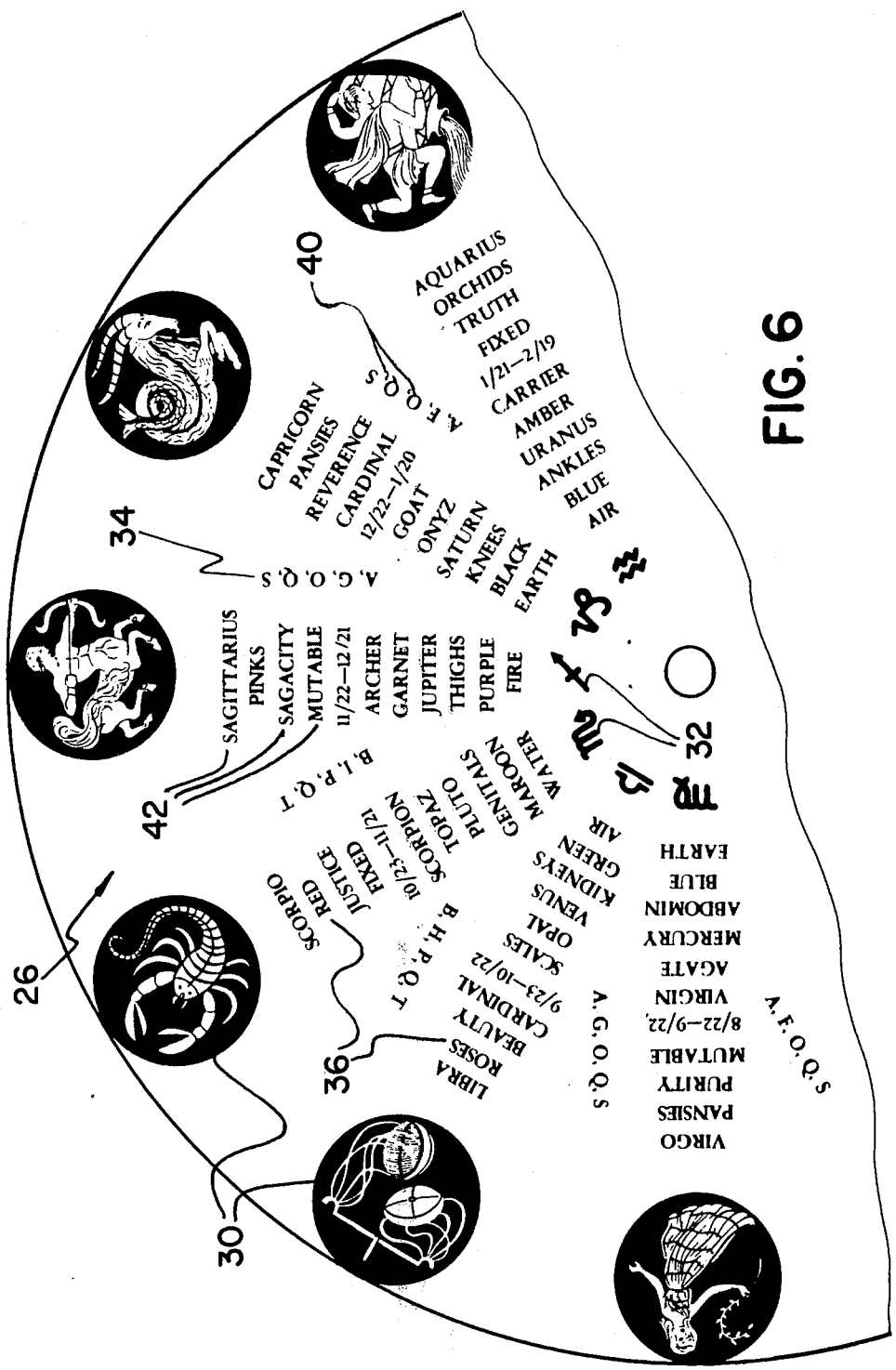
FIG. 6 is a side elevational view of a portion of one side of a central base plate member of the astrology chart apparatus of this invention.

The central plate indicia means 24 includes front side indicia means 26 and back side indicia means 28. As shown in FIGS. 1 and 6, the front side indicia means 26 includes house picture indicia 30; house symbol indicia 32; key words code indicia 34; and house characteristic indicia means 36. The house picture indicia 30 includes a dark circle 38 having therein a picture or outline of the "person characteristic" of that particular one of the twelve houses. For example, in the respective circles 38 are figures depicting the "person characteristic" as follows:

| Houses | Characteristic "Person" | Picture of |
| --- | --- | --- |
| Capricorn | Goat | Horned Goat |
| Aquarius | Carrier | Man with Water Pitcher |
| Pisces | Fishes | Two Fish |
| Aries | Ram | Horned Ram |
| Taurus | Bull | Forward Portion of Bull |
| Gemini | Twins | Boy-Girl Twins |
| Cancer | Crab | Top View of Crab |

-continued

| Houses | Characteristic "Person" | Picture of |
| --- | --- | --- |
| Leo | Lion | Side View of Lion |
| Virgo | Virgin | Virgin with Twig |
| Libra | Scales | Bouncing Scales of Justice |
| Scorpio | Scorpion | Top View of Scorpion |
| Sagittarius | Archer | Centaur with Bow and Arrow |

Figure 6A:
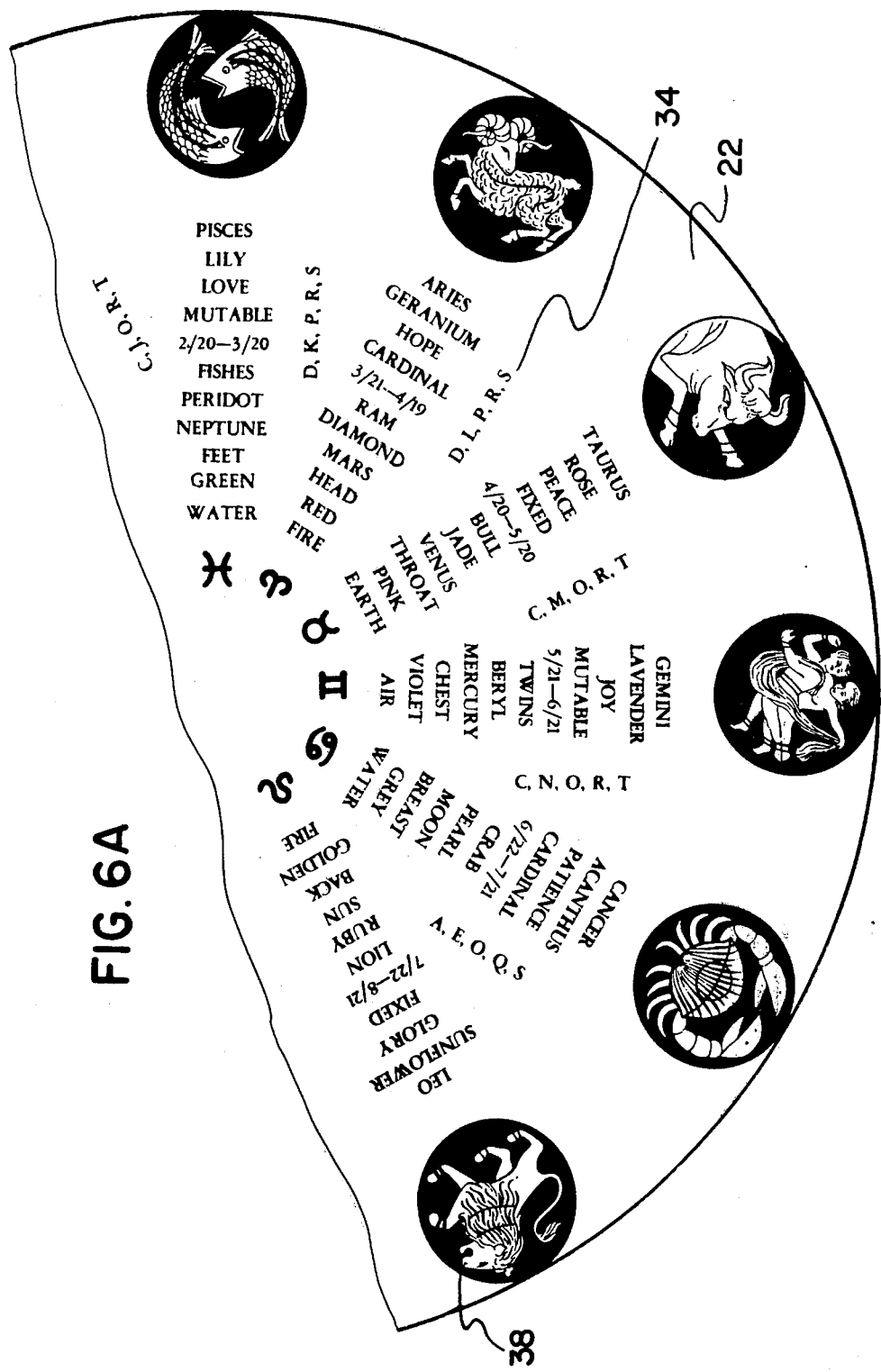
FIG. 6A is a side elevational view of a remaining portion of the one side of the central base plate member shown in FIG. 6.

The house symbol indicia 32 is placed with a circle near the center of the circular base plate member 22 and having a symbol radially aligned with a respective house picture indicia 30 as follows:

| House | House Symbol |
| --- | --- |
| Capricorn | (See FIGS. 6 and 6A) |
| Aquarius | (See FIGS. 6 and 6A) |
| Pisces | (See FIGS. 6 and 6A) |
| Aries | (See FIGS. 6 and 6A) |
| Taurus | (See FIGS. 6 and 6A) |
| Gemini | (See FIGS. 6 and 6A) |
| Cancer | (See FIGS. 6 and 6A) |

| House | House Symbol |
| --- | --- |
| Leo | (See FIGS. 6 and 6A) |
| Virgo | (See FIGS. 6 and 6A) |
| Libra | (See FIGS. 6 and 6A) |
| Scorpio | (See FIGS. 6 and 6A) |
| Sagittarius | (See FIGS. 6 and 6A) |

The key words code indicia 34 is a respective group of five (5) capital letters indicated at 40 associated with each house description and definition to set forth the main and dominant characteristic of any particular house. The group of letters are described and defined in a list of twenty (20) letters from A to T, inclusive, set forth on the first plate means 16 in a manner to be explained. The grouping of the five (5) letters associated with a respective house are as follows:

| House | Letter Group |
| --- | --- |
| Capricorn | D,L,P,R,S |
| Aquarius | C,M,O,R,T, |
| Pisces | C,N,O,R,T |
| Aries | A,E,O,Q,S |
| Taurus | A,F,O,Q,S |
| Gemini | A,G,O,Q,S |
| Cancer | B,H,P,Q,T |
| Leo | B,I,P,Q,T |
| Virgo | A,G,O,Q,S |
| Libra | A,F,O,Q,S |
| Scorpio | C,J,O,R,T |
| Sagittarius | D,K,P,R,S |

The house characteristics indicia 36 includes a separate list of special characteristics to describe each separate house. The house characteristic indicia 36 is divided into particular house characteristic indicia 42 identified with a category indicia carried on the first plate means 16 in a manner to be described. The particular house characteristic indicia 42 for a particular house and category indicia is as follows:

| Category Indicia | House | House | House |
|---|---|---|---|
| NAME | SAGITTARIUS | CAPRICORN | AQUARIUS |
| FLOWER | PINKS | PANSIES | ORCHIDS |
| WORD | SAGACITY | REVERENCE | TRUTH |
| QUALITY | MUTABLE | CARDINAL | FIXED |
| DATE | 11/22–12/21 | 12/22–1/20 | 1/21–2/19 |
| PERSON | ARCHER | GOAT | CARRIER |
| GEM | GARNET | ONYZ | AMBER |
| PLANET | JUPITER | SATURN | URANUS |
| BODY | THIGHS | KNEES | ANKLES |
| COLOR | PURPLE | BLACK | BLUE |
| ELEMENT | FIRE | EARTH | AIR |
| NAME | PISCES | ARIES | TAURUS |
| FLOWER | LILY | GERANIUM | ROSE |
| WORD | LOVE | HOPE | PEACE |
| QUALITY | MUTABLE | CARDINAL | FIXED |
| DATE | 2/20–3/20 | 3/21–4/19 | 4/20–5/20 |
| PERSON | FISHES | RAM | BULL |
| GEM | PERIDOT | DIAMOND | JADE |
| PLANET | NEPTUNE | MARS | VENUS |
| BODY | FEET | HEAD | THROAT |
| COLOR | GREEN | RED | PINK |
| ELEMENT | WATER | FIRE | EARTH |
| NAME | GEMINI | CANCER | LEO |
| FLOWER | LAVENDER | ACANTHUS | SUNFLOWER |
| WORD | JOY | PATIENCE | GLORY |
| QUALITY | MUTABLE | CARDINAL | FIXED |
| DATE | 5/21–6/21 | 6/22–7/21 | 7/22–8/21 |
| PERSON | TWINS | CRAB | LION |
| GEM | BERYL | PEARL | RUBY |
| PLANET | MERCURY | MOON | SUN |
| BODY | CHEST | BREAST | BACK |
| COLOR | VIOLET | GREY | GOLDEN |
| ELEMENT | AIR | WATER | FIRE |
| NAME | VIRGO | LIBRA | SCORPIO |
| FLOWER | PANSIES | ROSES | RED |
| WORD | PURITY | BEAUTY | JUSTICE |
| QUALITY | MUTABLE | CARDINAL | FIXED |
| DATE | 8/22–9/22 | 9/23–10/22 | 10/23–11/21 |
| PERSON | VIRGIN | SCALES | SCORPION |
| GEM | AGATE | OPAL | TOPAZ |
| PLANET | MERCURY | VENUS | PLUTO |
| BODY | ABDOMIN | KIDNEYS | GENITALS |
| COLOR | BLUE | GREEN | MAROON |
| ELEMENT | EARTH | AIR | WATER |

Figure 7:
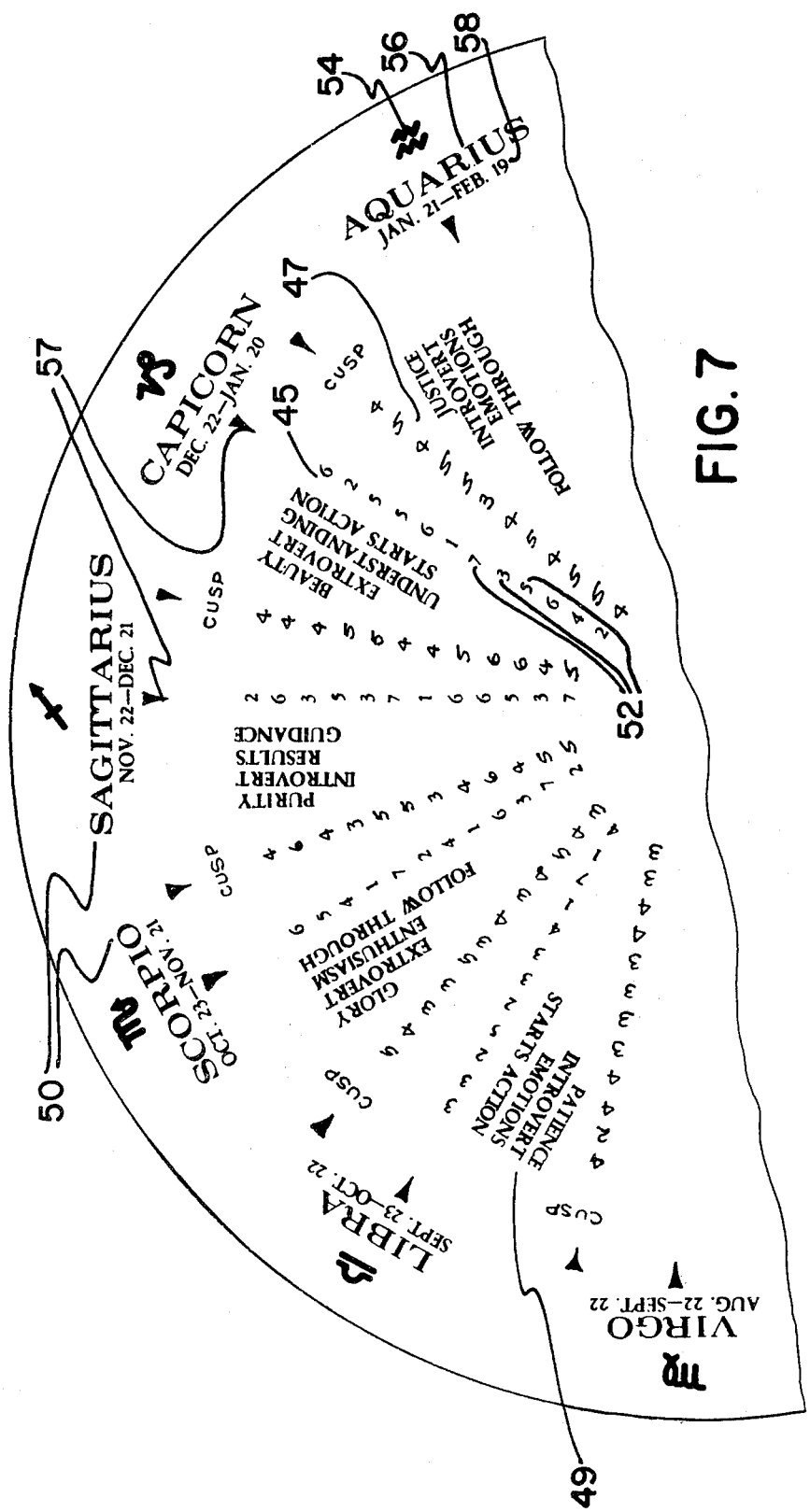
FIG. 7 is a side elevational view of a portion of an opposite side of the central base plate member shown in FIG. 6.
Figure 7A:
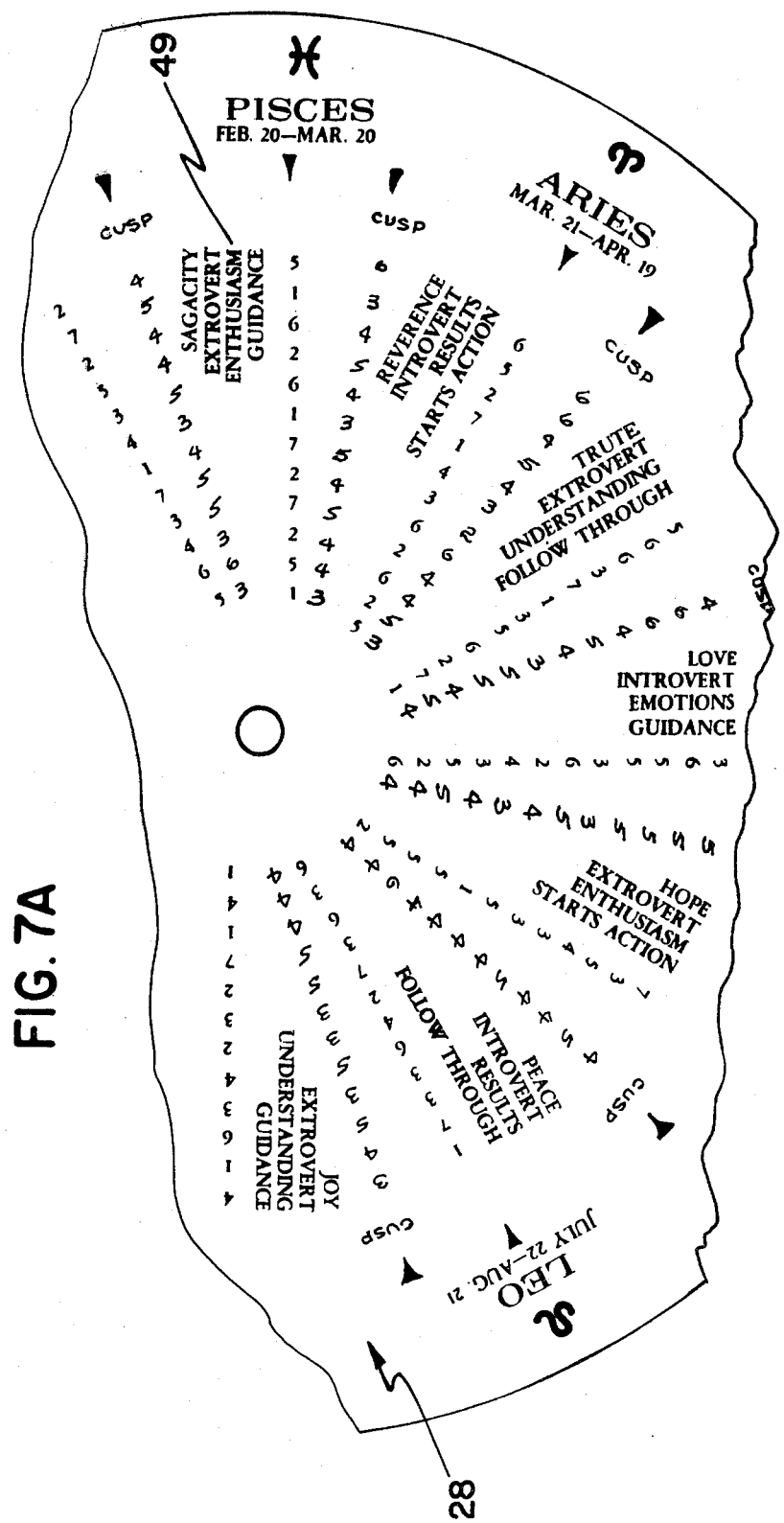
FIG. 7A is a side elevational view of another portion of the opposite side of the central base plate member shown in FIG. 7.

As shown in FIGS. 7 and 7A, the back side indicia means 28 includes sign compatability indicia 45; cusp sign compatability indicia 47; sign key word indicia 49; and house identification indicia 50. The sign compatability indicia 45 rates the compatability of one house to each of the other twelve houses on a scale of 1–7, inclusive. The definition of subject scale and alignment with the other twelve houses is set forth on the second plate means 18 in a manner to be explained. The sign compatability indicia 45 consists of twelve sets of number indicia 52 having numbers therein in the range of 1–7, inclusive, set forth in a radial line from the center of the base plate member 22 outwardly to be each aligned with a respective one of the house identification indicia 50.

The cusp sign compatability indicia 47 is similar in appearance to the sign compatability indicia 45 except it rates the compatability of a person born on the last day of the date period of one house or a person born on the first day of the date period of an adjacent house to that of the total twelve houses. Again, the ratings are on a scale of 1–7, inclusive, and extend radially from the center of the base plate member 22. The various readings of the sign compatability indicia 45 and the cusp sign compatability indicia 47 reads as follows:

| Houses | SAGITTARIUS | CUSP | CAPRICORN | CUSP |
|---|---|---|---|---|
| ARIES | 2 | 4 | 6 | 4 |
| TAURUS | 6 | 4 | 2 | 5 |
| GEMINI | 3 | 4 | 5 | 4 |
| CANCER | 5 | 5 | 5 | 5 |
| LEO | 3 | 5 | 6 | 5 |
| VIRGO | 7 | 4 | 1 | 3 |
| LIBRA | 1 | 4 | 7 | 4 |
| SCORPIO | 6 | 5 | 3 | 5 |
| SAGITTARIUS | 6 | 6 | 5 | 4 |
| CAPRICORN | 5 | 6 | 6 | 5 |
| AQUARIUS | 3 | 4 | 4 | 5 |
| PISCES | 7 | 5 | 2 | 4 |

| Houses | AQUARIUS | CUSP | PISCES | CUSP |
|---|---|---|---|---|
| ARIES | 2 | 4 | 5 | 6 |
| TAURUS | 7 | 5 | 1 | 3 |
| GEMINI | 2 | 4 | 6 | 4 |
| CANCER | 5 | 4 | 2 | 5 |
| LEO | 3 | 5 | 6 | 4 |
| VIRGO | 4 | 3 | 1 | 3 |
| LIBRA | 1 | 4 | 7 | 5 |
| SCORPIO | 7 | 5 | 2 | 4 |
| SAGITTARIUS | 3 | 5 | 7 | 5 |
| CAPRICORN | 4 | 3 | 2 | 4 |
| AQUARIUS | 6 | 6 | 5 | 4 |
| PISCES | 5 | 3 | 1 | 3 |

| Houses | ARIES | CUSP | TAURUS | CUSP |
|---|---|---|---|---|
| ARIES | 6 | 6 | 5 | 4 |
| TAURUS | 5 | 6 | 6 | 6 |
| GEMINI | 2 | 4 | 6 | 6 |
| CANCER | 7 | 5 | 3 | 4 |
| LEO | 1 | 4 | 7 | 5 |
| VIRGO | 4 | 3 | 1 | 4 |
| LIBRA | 3 | 2 | 3 | 3 |
| SCORPIO | 6 | 6 | 5 | 5 |
| SAGITTARIUS | 2 | 4 | 6 | 5 |
| CAPRICORN | 6 | 4 | 2 | 4 |
| AQUARIUS | 2 | 5 | 7 | 5 |
| PISCES | 5 | 3 | 1 | 4 |

| Houses | GEMINI | CUSP | CANCER | CUSP |
|---|---|---|---|---|
| ARIES | 3 | 5 | 7 | 4 |
| TAURUS | 6 | 5 | 3 | 5 |
| GEMINI | 5 | 5 | 5 | 4 |
| CANCER | 5 | 5 | 4 | 4 |
| LEO | 3 | 3 | 3 | 5 |
| VIRGO | 6 | 5 | 3 | 4 |
| LIBRA | 2 | 4 | 5 | 4 |
| SCORPIO | 4 | 3 | 1 | 4 |
| SAGITTARIUS | 3 | 4 | 5 | 4 |
| CAPRICORN | 5 | 5 | 5 | 6 |
| AQUARIUS | 2 | 4 | 5 | 4 |
| PISCES | 6 | 4 | 2 | 4 |

| Houses | LEO | CUSP | VIRGO | CUSP |
|---|---|---|---|---|
| ARIES | 1 | 3 | 4 | 4 |
| TAURUS | 7 | 4 | 1 | 2 |
| GEMINI | 3 | 5 | 6 | 4 |
| CANCER | 3 | 3 | 3 | 4 |
| LEO | 6 | 5 | 4 | 3 |
| VIRGO | 4 | 3 | 2 | 3 |
| LIBRA | 2 | 3 | 3 | 3 |
| SCORPIO | 7 | 5 | 2 | 3 |
| SAGITTARIUS | 3 | 5 | 7 | 4 |
| CAPRICORN | 6 | 4 | 1 | 4 |
| AQUARIUS | 3 | 4 | 4 | 3 |
| PISCES | 6 | 4 | 1 | 3 |

| Houses | LIBRA | CUSP | SCORPIO | CUSP |
|---|---|---|---|---|
| ARIES | 3 | 5 | 6 | 4 |
| TAURUS | 3 | 4 | 5 | 6 |
| GEMINI | 2 | 3 | 4 | 4 |
| CANCER | 5 | 3 | 1 | 3 |
| LEO | 2 | 5 | 7 | 5 |
| VIRGO | 3 | 3 | 2 | 5 |
| LIBRA | 3 | 4 | 4 | 3 |
| SCORPIO | 4 | 3 | 1 | 4 |
| SAGITTARIUS | 1 | 4 | 6 | 6 |
| CAPRICORN | 7 | 5 | 3 | 4 |

| | | | |
|---|---|---|---|
| AQUARIUS | 1 | 4 | 7 | 5 |
| PISCES | 4 | 3 | 2 | 5 |

The key word indicia 49 is a list of four (4) key words to set forth the particular characteristic of a respective one of the twelve houses which will be observed through an opening in the overlapping second plate means 18 in a manner to be explained. The respective sign key word indicia 49 for each respective house reads as follows:

| SAGITTARIUS | CAPRICORN | AQUARIUS |
|---|---|---|
| SAGACITY | REVERENCE | TRUTH |
| EXTROVERT | INTROVERT | EXTROVERT |
| ENTHUSIASM | RESULTS | UNDERSTANDUNG |
| GUIDANCE | STARTS ACTION | FOLLOW THROUGH |
| PISCES | ARIES | TAURUS |
| LOVE | HOPE | PEACE |
| INTROVERT | EXTROVERT | INTROVERT |
| EMOTIONS | ENTHUSIASM | RESULTS |
| GUIDANCE | STARTS ACTION | FOLLOW THROUGH |
| GEMINI | CANCER | LEO |
| JOY | PATIENCE | GLORY |
| EXTROVERT | INTROVERT | EXTROVERT |
| UNDERSTAND-ING | EMOTIONS | ENTHUSIASM |
| GUIDANCE | STARTS ACTION | FOLLOW THROUGH |
| VIRGO | LIBRA | SCORPIO |
| PURITY | BEAUTY | JUSTICE |
| INTROVERT | EXTROVERT | INTROVERT |
| RESULTS | UNDERSTAND-ING | EMOTIONS |
| GUIDANCE | STARTS ACTION | FOLLOW THROUGH |

The house identification indicia 50 includes for each of the twelve houses (1) symbol indicia 54; (2) name indicia 56; (3) arrow or pointer indicia 57; and (4) date indicia 58. The symbol indicia 54 is the short symbol of the house; the name indicia 56 is the house name such as LEO, LIBRA, etc., and the data indicia 58 indicates the days covered by each house such as LEO being July 22–August 21; LIBRA being September 23–October 22; etc. The collective, respective elements of the house identification indicia 50 is as follows:

| Name Indicia | SAGITTARIUS | CAPRICORN | AQUARIUS |
|---|---|---|---|
| Date Indicia | Nov. 22–Dec. 21 | Dec. 22–Jan. 20 | Jan. 21–Feb. 19 |
| Name Indicia | PISCES | ARIES | TAURUS |
| Date Indicia | Feb. 20–Mar. 20 | Mar. 21–Apr. 19 | Apr. 20–May 20 |
| Name Indicia | GEMINI | CANCER | LEO |
| Date Indicia | May 21–June 21 | June 22–July 21 | July 22–Aug. 21 |
| Name Indicia | VIRGO | LIBRA | SCORPIO |
| Date Indicia | Aug. 22–Sept. 22 | Sept. 23–Oct. 22 | Oct. 23–Nov. 21 |

Figure 2:
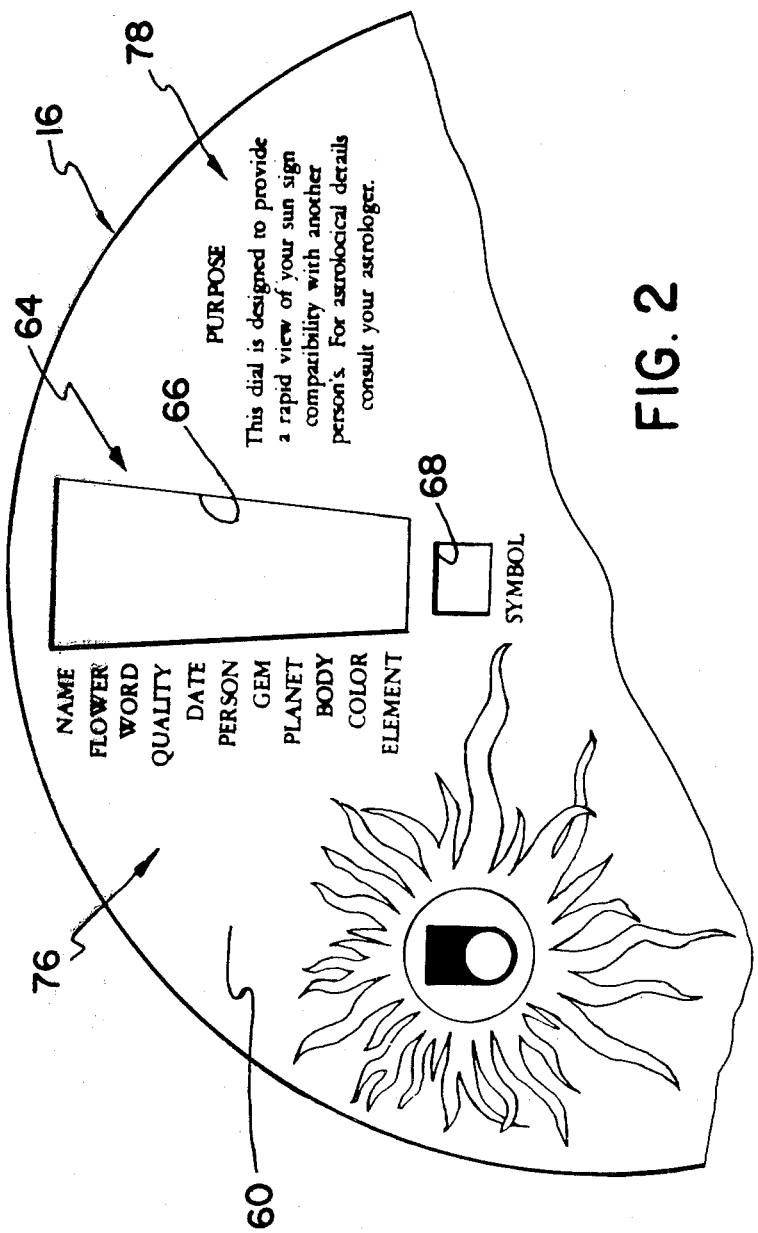
FIG. 2 is a view of a portion of one side of a front plate member of the astrology chart apparatus of this invention.
Figure 2A:
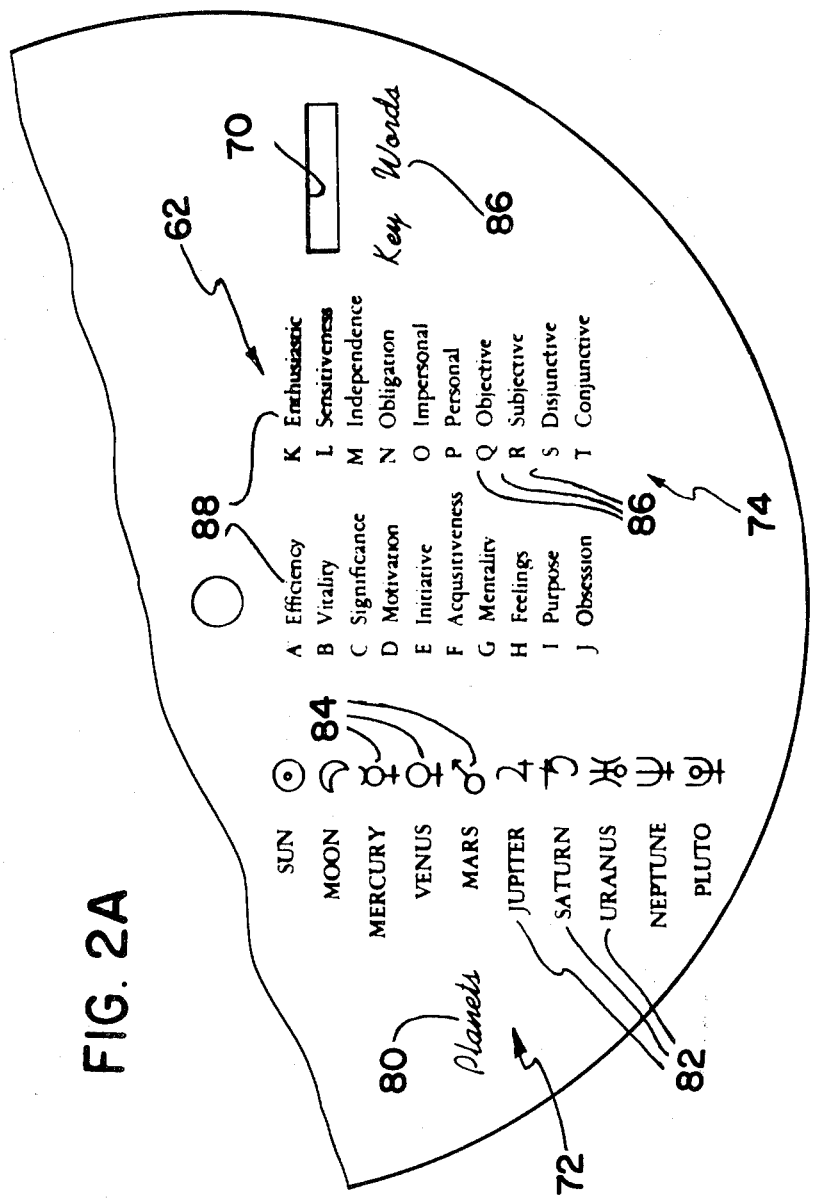
FIG. 2A is a view of a remaining portion of the one side of the front plate member shown in FIG. 2.

As shown in FIGS. 2 and 2A, the first or plate means 16 is of a disk shape of a diameter less than the circular base plate member 22 whereby the house picture indicia 30 is observed adjacent an outer periphery of the first plate means 16. The first plate means 16 includes a front plate or disk member 60; first or front plate indicia means 62 on the outwardly facing surface of the front plate member 60; and first or front window means 64 in the front plate member 60 for reasons to be discussed.

The front window means 64 includes (1) a house characteristic window 66; (2) a house symbol window 68; and (3) a key words window 70; all being cut-out openings in the front plate member 60 to allow the observation and reading of information present in the front side indicia means 26. The house characteristic window 66 is of a trapezoidal shape operable to reveal a separate set of particular house characteristics 42 when aligned with a specific house picture indicia 30.

The house symbol window 68 is of generally square shape adapted to selectively reveal a house symbol indicia 32 respective to a radially aligned one of the house picture indicia 30.

The key words window 70 is of generally rectangular shape and operable to reveal the key words code letters 34 (group of five with letters selected from A-T, inclusive) present on the base plate member 22. The meaning of these key words code letters 34 will be set forth herein.

The front plate indicia means 62 includes (1) planet indicia 72; (2) person's characteristic indicia 74; (3) characteristic categorizing indicia 76; and (4) purpose indicia 78. The planet indicia 72 includes identification indicia 80; planet name indicia 82; and planet symbol indicia 84. The identification indicia 80 consists of the word "Planets". The remaining portion of the planet indicia 72 reads as follows:

| Planet Name Indicia 82 | Planet Symbol Indicia 84 |
|---|---|
| Sun | (See FIG. 2A) |
| Moon | (See FIG. 2A) |
| Mercury | (See FIG. 2A) |
| Venus | (See FIG. 2A) |
| Mars | (See FIG. 2A) |
| Jupiter | (See FIG. 2A) |
| Saturn | (See FIG. 2A) |
| Uranus | (See FIG. 2A) |
| Neptune | (See FIG. 2A) |
| Pluto | (See FIG. 2A) |

The person's characteristic indicia 74 includes characteristic identification indicia 86 (letters A-T, inclusive and term "Key Words") and word characteristic indicia 88. The relation between the characteristic identification indicia 86 and the word characteristic indicia 88 is as follows:

| Characteristic Identification Indicia 86 | Word Characteristic Indicia 88 |
|---|---|
| A | Efficiency |
| B | Vitality |
| C | Significance |
| D | Motivation |
| E | Initiative |
| F | Acquisitiveness |
| G | Mentality |
| H | Feelings |
| I | Purpose |
| J | Obsession |
| K | Enthusiastic |
| L | Sensitiveness |
| M | Independence |
| N | Obligation |
| O | Impersonal |
| P | Personal |
| Q | Objective |
| R | Subjective |
| S | Disjunctive |

| Characteristic Identification Indicia 86 | Word Characteristic Indicia 88 |
| --- | --- |
| T | Conjunctive |

The characteristic catagorizing indicia 76 sets forth the general definition or identification of the various characteristics known in each of the twelve houses. The characteristic categorizing indicia 76 is placed adjacent to the house characteristic window 66 to reveal a selected one of the particular house characteristics 42. The identification of the characteristic categorizing indicia 76 is as follows:

NAME
FLOWER
WORD
QUALITY
DATE
PERSON
GEM
PLANET
BODY
COLOR
ELEMENT

The purpose indicia 78 sets for the intended use of the astrology chart apparatus 12 of this invention and reads as follows:

PURPOSE

This dial is designed to provide a rapid view of your sun sign compatibility with another person's. For astrological details consult your astrologer.

Figure 5:
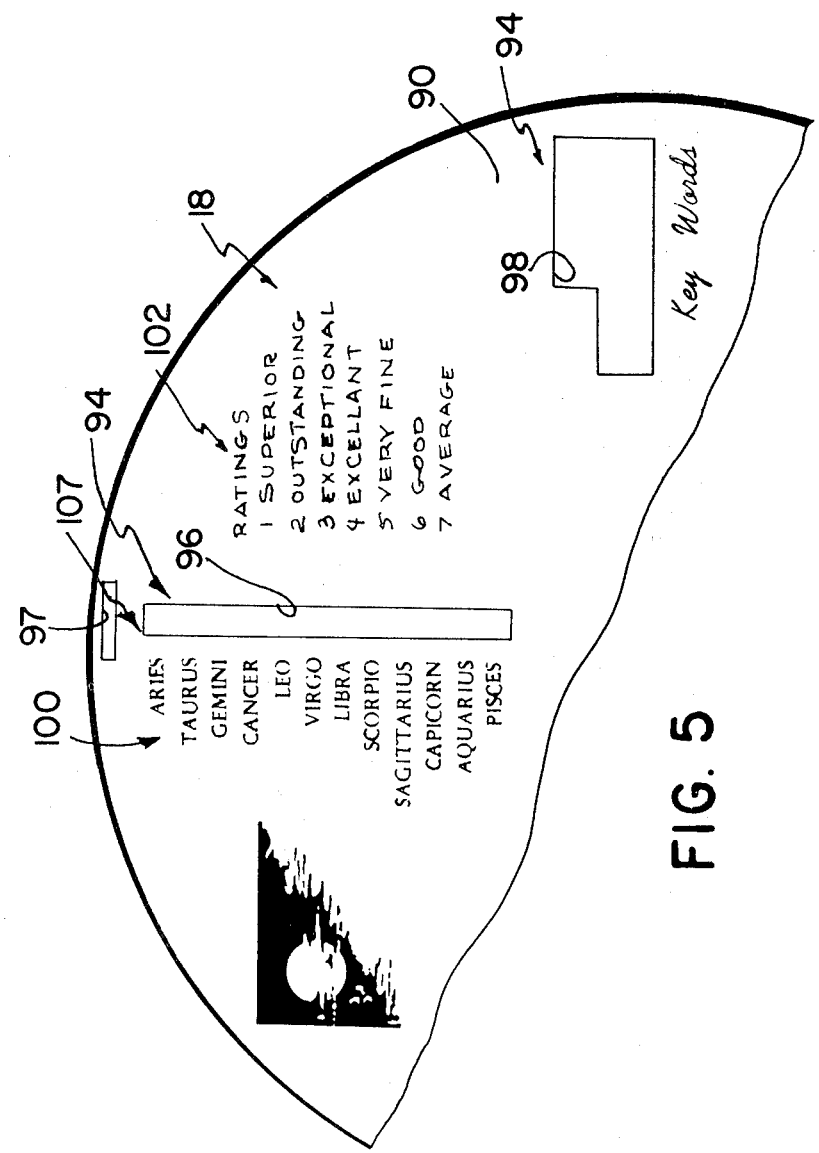
FIG. 5 is a view of a portion of one side of a back plate member of the astrology chart apparatus of this invention.

As shown in FIGS. 5 and 5A the second or plate means 18 includes (1) a back plate or disk member 90; (2) second or back plate indicia means 92 on the outward facing surface on the back plate member 90; and (3) second or back window means 94. The back plate member 90 is of a circular shape of less diameter than the circular base plate member 22 so as to observe and be selectively alignable with the house identification indicia 50.

The back window means 94 are cut out openings and include a radially extended house comparison window 96; a cusp window 97; and a back key words window 98. The house comparison window 96 is of elongated rectangular shape operable to be aligned and selectively reveal the sign compatability indicia 45 and the cusp sign compatability indicia 47 on the central base means 14. The cusp window 97 acts to reveal the word "CUSP" between adjacent ones of the sign capatability indicia 45 when the respective cusp sign compatability indicia 47 is aligned with the house comparison window 96.

The back key words window 98 is of a stepped shape to reveal the word characteristics of a selected house lined up with the house comparison window 96. The key words showing through the back key words window 98 are identified by the sign key word indicia 49 in regard to the respective houses.

The back plate indicia means 92 includes (1) house name indicia 100; (2) rating identification indicia 102; (3) instructions indicia 104; and (4) definition indicia means 106. The house name indicia 100 is placed adjacent the house comparison window 96 to align an arrow indicia 107 and respective house names with sign compatability indicia 45 and cusp sign capability indicia 47 in a manner to be explained. The house name indicia 100 is a radially extended list of the house names such as follows:

ARIES
TAURUS
GEMINI
CANCER
LEO
VIRGO
LIBRA
SCORPIO
SAGITTARIUS
CAPRICORN
AQUARIUS
PISCES

The rating identification indicia 102 compares one house relative to all the houses to give a quick analysis of compatability. The rating identification indicia 102 reads as follows:

RATING

1 Superior
2 Outstanding
3 Exceptional
4 Excellent
5 Very Fine
6 Good
7 Average

The instructions indicia 104 sets forth operating instructions and read as follows:

Place your sign at the top of the dial. Read down the index to the sign of the other person. The number opposite their sign is the rating for the two of you. EXAMPLE; CANCER entered at the top of the dial, read down to SCORPIO, the number is one (1). This is "Superior" on rating scale. All other information pertains to the sign entered.

The definition indicia means 106 acts to clarify characteristics of the various houses and consists of (1) element indicia 108; (2) quality indicia 110; and (3) character indicia 112. The element indicia 108 reads as follows:

ELEMENT

Fire: Enthusiasm
Air: Understanding
Water: Emotions
Earth: Results

The quality indicia 110 reads as follows:

QUALITY

Cardinal: Starts Action
Fixed: Follows Through
Mutable: Guidance

The character indicia 112 reads as follows:

CHARACTER

Extroverted: Assertive, Outgoing
Introverted: Less Assertive, Shy

As noted in FIGS. 1, 3, and 4, the fastening means 20 is preferrable of a loose fitting rivet type having a base member 116 connected to a cap member 118 to allow relative rotation of the first and second plate means 16, 18 about the central base means 14.

USE AND OPERATION OF THE INVENTION

Referring to FIG. 4, it is noted that the first plate means 16 and the second plate means 18 are rotatably mounted against opposite sides of the central base means 14. It is seen that the outer edge of the central base means 14 extends outwardly of the first and second plate means 16, 18 to present a grasping or holding area while one uses the other hand to selectively rotate the first and second plate means 16, 18.

As noted in FIG. 1 and 1A, the first plate means 16 is rotated to align the house characteristics window 66 and house symbol window 68 over one of the house characteristics indicia 36 and house symbol indicia 32. Simultaneously due to proper spacing of the cut outs and locations of data on the central base means 14, the key words window 70 is placed about the five letters of the key word code indicia 34. For example, if the house characteristics window 66 is aligned with Sagittarius, we would find the following characteristics of the house:

| NAME | SAGITTARIUS |
|---|---|
| FLOWER | PINKS |
| WORD | SAGACITY |
| QUALITY | MUTABLE |
| DATE | 11/22–12/21 |
| PERSON | ARCHER |
| GEM | GARNET |
| PLANET | JUPITER |
| BODY | THIGHS |
| COLOR | PURPLE |
| ELEMENT | FIRE |
| SYMBOL | (See FIG. 1) |
| Key Words | D,K,P,R,S |
| | or translated to the definitions of the letters - Motivation, Enthusiastic, Personal, Subjective, Disjunctive |

Therefore, you can readily find the main characteristics of any house in a rapid manner and, of course, easily compare to the characteristics of a different house. The first plate means 16 can then be rotated to another house to get a different set of characteristics readings.

The astrology chart apparatus 12 can then be turned over to utilize the second plate means 18 with the central base means 14. The second plate means 18 is rotated to compare house characteristics by aligning the arrow 107 on the second plate means 18 with an arrow 57 in the back side indicia means 28. For example, let's align arrow 107 with the arrow 57 above the sign compatability indicia 52 for the house identification indicia 50 for the house of "Sagittarius". In this position, the house identification on indicia 50 reads:

SAGITTARIUS

NOV. 22—DEC. 21

The sign compatability indicia 45 there below is aligned with the house name indicia 100 to give a compatability reading between "Sagittarius" and the other houses as follows:

| Name Indicia 100 | Sign Compatability Indicia 45 |
|---|---|
| ARIES | 2 |
| TAURUS | 6 |
| GEMINI | 3 |
| CANCER | 5 |
| LEO | 3 |
| VIRGO | 7 |
| LIBRA | 1 |
| SCORPIO | 6 |
| SAGITTARIUS | 6 |
| CAPRICORN | 5 |
| AQUARIUS | 3 |
| PISCES | 7 |

Thus, one is able to quickly check the compatability of "Sagittarius" with its same house and the remaining eleven houses.

It is noted that the cusp sign compatability feature can be found be further rotation of the second plate means 18 to align the house comparison window 96 with the cusp sign capability indicia 47. The "cusp" is the reading of dates when one house date ends and another begins such as those born on Dec. 21 and Dec. 22 are in a "cusp" between Sagittarius and Capricorn. Thus, those born on any "cusp" can determine their compatability with all the houses by the astrology chart apparatus 12 of this invention. For example, the "cusp" between "Sagittarius" and "Capricorn" for compatability reads as follows:

| Name Indicia 100 | Cusp Sign Capability Indicia 47 |
|---|---|
| ARIES | 4 |
| TAURUS | 4 |
| GEMINI | 4 |
| CANCER | 5 |
| LEO | 5 |
| VIRGO | 4 |
| LIBRA | 4 |
| SCORPIO | 5 |
| SAGITTARIUS | 6 |
| CAPRICORN | 6 |
| AQUARIUS | 4 |
| PISCES | 5 |

Of course, one now refers to the rating identification indicia 102 to receive the interpretation and meaning of the numbers 1–7 received from the cusp sign capability indicia.

The evaluation of the numbers (1–7) in the sign compatability indicia 40 are translated into meaningful terms by reference to the rating identification indicia 102 as described and set forth in this specification.

In this same position of arrows 107 and 57 aligned for "Sagittarius", it is such that Key Word Characteristics are visible through the back key words window 98 to reveal the respective sign key word indicia 49. In this position, the sign key word indicia 49 reads:

SAGACITY

EXTROVERT

ENTHUSIASM

GUIDANCE

Next, one may refer to the definition indicia means 106 to obtain a further astrological interpretation of the above noted sign key word indicia 49 for "Sagittarius".

Further, the instruction indicia 104 sets forth an aid to using the astrology chart apparatus 12 of this invention.

The astrology chart apparatus of this invention is an inexpensive, easy to use, reference chart to obtain astrology sun signs comparisons without the need for extensive charts and graphs.

While the invention has been described in conjunction with preferred specific embodiments thereof, it will be understood that this description is intended to illustrate and not to limit the scope of the invention, which is defined by the following claims.

I claim:

1. An astrology chart apparatus, comprising;
   (a) a central base means having a base plate member with central plate indicia means thereon;
   (b) a first means pivotally connected to said central base means;
   (c) said central base means extended beyond the outer edge of said first means with said central plate indicia means having house picture indicia on said extended portion to identify respective houses of heaven;
(d) said central plate indicia means having house characteristic indicia means underlying said first means, associated with a respective one of said house picture indicia;
(e) said first means includes first indicia means and first window means thereon;
(f) said first indicia means includes characteristic categorizing indicia to be associated with said house characteristic indicia;
(g) said first window means having a characteristic window adjacent said characteristic category indicia, said house charateristic indicia, and said characteristic categorizing indicia;
(h) a second means piviotally connected to said central base means on a side opposite said connection of said first means thereto;
(i) said second means includes second indicia means and second window means;
(j) said central plate indicia means includes sign key word indicia underlying said second means; and
(k) said second window means includes a second key words window for aligning and viewing said sign key word indicia therethrough.

2. An astrology chart apparatus as described in claim 1, including:
(a) said central base means extended beyond the outer edge of said second means with said central plate indicia means having house identification indicia on said extended portion to identify respective houses of heaven;
(b) said central plate indicia means having sign compatability indicia underlying said second means; associated with a respective one of said house identification indicia;
(c) said second indicia means includes house name indicia to be associated with said sign capability indicia; and
(d) said second window means includes a house window adjacent said house identification indicia for viewing and aligning said sign capatability indicia, said house identification indicia, and said house name indica.

3. An astrology chart apparatus, comprising;
(a) a central base means having a base plate member with central plate indicia means thereon;
(b) a first means pivotally connected to said central base means;
(c) said central base means extended beyond the outer edge of said first means with said central plate indicia means having house picture indicia on said extended portion to identify respective houses of heaven;
(d) said central plate indicia means having house characteristic indicia means underlying said first means, associated with a respective one of said house picture indicia;
(e) said first means includes first indicia means and first window means thereon;
(f) said first indicia means includes characteristic categorizing indicia to be associated with said house characteristic indicia;
(g) said first window means having a characteristic window adjacent said characteristic category indicia for viewing and aligning said house picture indicia, said house characteristic indicia, and said characteristic categorizing indicia;
(h) a second means pivotally connected to said central base means on a side opposite said connection of said first means thereto;
(i) said central base means extended beyond the outer edge of said second means with said central plate indicia means having house identification indicia on said extended portion to identify respective houses of heaven;
(j) said central plate indicia means having sign compatability indicia underlying said second means; associated with a respective one of said house identification indicia;
(k) said second means includes second indicia means and second window means;
(l) said second indicia means includes house name indicia to be associated with said sign capability indicia;
(m) said second window means includes a house window adjacent said house identification indicia for viewing and aligning said sign capatability indicia, said house identification indicia, and said house name indica;
(n) said central plate indicia means includes sign key words indicia underlying said second means;
(o) said second window means includes a second key words window for aligning and viewing said sign key word indicia therethrough;
whereby said first means can be rotated and aligned with a respective one of said house picture indicia to obtain the respective characteristics of subject house of heaven from reading said characteristic categorizing indicia and said house characteristic indicia means; and
whereby said sign key word indicia sets forth characteristics of respective houses of heavens when said house window is aligned with said house identification indicia.

4. An astrology chart apparatus as described in claim 3, wherein:
(a) said sign compatability indicia having compatability symbols indicating from greater to lessor the compatability of one house of heaven to all of the houses of heaven to quickly indicate person's compatability under astrology.

5. An astrology chart apparatus as described in claim 4, wherein:
(a) said second indicia means includes rating identification indicia to be used with said compatability symbols to interpret the compatability of respective one's of said house identification indicia with said house name indicated.

6. An astrology chart apparatus as described in claim 3, wherein:
(a) said second indicia means includes a definition indicia means used to explain said sign key word indicia as seen through said second key words window.

7. An astrology apparatus comprising;
(a) a central base means having a base plate member with central plate indicia means thereon;
(b) a back plate means pivotally connected to said central base means;
(c) said central base means extended beyond the outer edge of said back plate means with said central plate indicia means having house identification indicia on said extended portion to identify respective houses of heaven;

(d) said central plate indicia means having sign capability indicia underlying said back plate means, associated with a respective one of said house identification indicia;

(e) said back plate means includes back plate indicia means and back plate window means;

(f) said back plate indicia means includes house name indicia to be associated with said sign capability indicia;

(g) said back plate indicia means includes a house window adjacent said house name indicia for viewing and aligning with said sign compatability indicia, said house identification indica, and said house name indicia;

(h) a first means pivotally connected to said central base means;

(i) said first means includes first indicia means and first window means thereon;

(j) said first window means having a charactristic window adjacent said characteristic category indicia for viewing and aligning said house picture indicia, said house characteristic indicia, and said characteristic categorizing indicia;

(k) said central plate indicia means includes sign key word indicia underlying said back plate means; and (l) said back plate window means includes a back key words window for aligning and viewing said sign key word indicia therethrough.

8. An astrology chart apparatus as described in claim 7, wherein:

(a) said sign compatability indicia having compatability symbols indicating from greater to lessor the compatability of one house of heaven to all of the houses of heaven to quickly indicate person's compatability under astrology.

9. An astrology chart apparatus as described in claim 7, wherein:

(a) said back plate indicia means includes an instructions indicia to set forth steps to be followed to compare compatability of various houses of heaven on using the astrology chart apparatus of this invention.

* * * * *